United States Patent
Gunaratna et al.

(10) Patent No.: US 9,904,669 B2
(45) Date of Patent: Feb. 27, 2018

(54) ADAPTIVE LEARNING OF ACTIONABLE STATEMENTS IN NATURAL LANGUAGE CONVERSATION

(71) Applicant: International Business Machines Corporation, Armonk, NY (US)

(72) Inventors: Dalkandura Arachchige Kalpa Shashika Silva Gunaratna, Beavercreek, OH (US); Hamid Reza Motahari Nezhad, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/995,116

(22) Filed: Jan. 13, 2016

(65) Prior Publication Data

US 2017/0199866 A1    Jul. 13, 2017

(51) Int. Cl.
  *G06F 17/00*    (2006.01)
  *G06F 15/00*    (2006.01)
  *G06F 17/27*    (2006.01)

(52) U.S. Cl.
  CPC .......... *G06F 17/271* (2013.01); *G06F 17/277* (2013.01); *G06F 17/2735* (2013.01)

(58) Field of Classification Search
  CPC ... G06F 17/271; G06F 17/2735; G06F 17/277
  See application file for complete search history.

(56) References Cited

U.S. PATENT DOCUMENTS 5,907,839 A * 5/1999 Roth ................... G06F 17/273
7,890,928 B2 * 2/2011 Patrudu .............. G06F 17/2785
                                                    707/802
8,032,602 B2   10/2011 Lavoie et al.
8,180,713 B1 * 5/2012 Rigby .................... G06Q 40/06
                                                    706/12
8,346,875 B2   1/2013 Gillai et al.
8,548,915 B2   10/2013 Antebi et al.
8,725,659 B2   5/2014 Weising
9,015,254 B2   4/2015 Brdiczka
(Continued)

OTHER PUBLICATIONS

Searle J.R., "Speech Acts: An Essay in the Philosophy of Language," Cambridge University Press, Chapter 2, Jan. 1970, pp. 22-53.

(Continued)

*Primary Examiner* — Fariba Sirjani
(74) *Attorney, Agent, or Firm* — Zilka-Kotab, P.C.

(57) ABSTRACT

Identifying actionable statements in communications may include: extracting features from at least one training statement; training a pattern recognition module to identify one or more types of patterns in actionable statements based at least in part on the features; and generating an actionable statement identification model using the trained action verb module and the trained pattern recognition module. Identifying actionable statements in communications is preferably adaptive in a continuous manner (e.g. based on user feedback), and may also include: determining whether a statement includes an actionable statement; predicting an actionable statement class of the actionable statement based on a pattern represented in the statement; and outputting the predicted actionable statement class to a user. Corresponding systems and computer program products are also disclosed.

15 Claims, 8 Drawing Sheets

(56) References Cited

U.S. PATENT DOCUMENTS

| | | | |
|---|---|---|---|
| 9,037,578 | B2 | 5/2015 | Brust et al. |
| 9,094,361 | B2 | 7/2015 | Camacho et al. |
| 9,170,993 | B2 | 10/2015 | Kalia et al. |
| 9,235,278 | B1* | 1/2016 | Cheng ............... G06F 3/038 |
| 2005/0060643 | A1 | 3/2005 | Lass et al. |
| 2005/0203880 | A1* | 9/2005 | Meredith ............ G06F 9/4446 |
| 2006/0069589 | A1* | 3/2006 | Nigam ............... G06Q 30/02 706/55 |
| 2006/0133587 | A1* | 6/2006 | Bushey ............. H04M 3/5166 379/88.14 |
| 2006/0253537 | A1 | 11/2006 | Thomas |
| 2010/0179961 | A1* | 7/2010 | Berry ............... G06F 17/30908 707/769 |
| 2011/0035210 | A1* | 2/2011 | Rosenfeld ........... G06F 17/278 704/9 |
| 2011/0078127 | A1* | 3/2011 | Lin ................... G06F 17/3064 707/706 |
| 2011/0295864 | A1 | 12/2011 | Betz et al. |
| 2012/0101975 | A1* | 4/2012 | Khosravy ........... G06Q 30/02 706/55 |
| 2012/0253788 | A1 | 10/2012 | Heck et al. |
| 2013/0046822 | A1 | 2/2013 | Noble et al. |
| 2014/0032209 | A1* | 1/2014 | Etzioni ............... G06F 17/277 704/9 |
| 2014/0052728 | A1 | 2/2014 | Nakazawa et al. |
| 2014/0082521 | A1* | 3/2014 | Carolan ............. H04L 51/00 715/752 |
| 2014/0156676 | A1* | 6/2014 | Brust ............... G06F 17/30554 707/748 |
| 2014/0214404 | A1* | 7/2014 | Kalia ............... G06F 17/28 704/9 |
| 2014/0219434 | A1 | 8/2014 | Youel et al. |
| 2014/0222830 | A1* | 8/2014 | Ringer ............. G06F 17/30041 707/748 |
| 2014/0289258 | A1* | 9/2014 | Joshi ............... G06Q 10/107 707/741 |
| 2015/0121216 | A1* | 4/2015 | Brown ............. G06N 3/006 715/707 |
| 2015/0142825 | A1 | 5/2015 | Deshmukh et al. |
| 2015/0154179 | A1 | 6/2015 | Allen et al. |
| 2015/0215253 | A1 | 7/2015 | Vemuri et al. |
| 2015/0256675 | A1 | 9/2015 | Sri et al. |
| 2015/0278339 | A1* | 10/2015 | Cherukuri ......... G06F 17/30598 707/738 |
| 2015/0331914 | A1* | 11/2015 | Cherukuri ......... H04L 67/306 707/709 |
| 2015/0356142 | A1* | 12/2015 | Proux ............. G06F 17/30598 706/11 |
| 2016/0179801 | A1* | 6/2016 | Venkataraman .. G06F 17/30038 707/771 |
| 2016/0196298 | A1* | 7/2016 | Bradley ............ G06F 17/30377 707/694 |
| 2016/0359740 | A1* | 12/2016 | Parandehgheibi .. H04L 63/1425 |
| 2017/0018269 | A1* | 1/2017 | Lev ................... G06F 17/2775 |
| 2017/0024659 | A1* | 1/2017 | Stromsten ............ G06N 99/005 |
| 2017/0031914 | A1* | 2/2017 | De Mars ............. G06F 17/3053 |
| 2017/0075935 | A1* | 3/2017 | Lagos ............... G06F 17/30321 |
| 2017/0083606 | A1* | 3/2017 | Mohan ............. G06F 17/30598 |
| 2017/0200093 | A1 | 7/2017 | Motahari Nezhad |

OTHER PUBLICATIONS

List of IBM Patents or Patent Applications Treated As Related.
Dey et al., "Mining Customer Feedbacks for Actionable Intelligence," International Conference on Web Intelligence and Intelligent Agent Technology, IEEE, Aug. 2010, pp. 239-242.
Takeuchi et al., "A Conversation-Mining System for Gathering Insights to Improve Agent Productivity," The 9th IEEE International Conference on E-Commerce Technology and the 4th IEEE International Conference on Enterprise computing, E-Commerce and E-Services, Jul. 2007, 4 pages.
Woo et al., "Conversation System for Natural Communication with Robot Partner," Mecatronics—2014—Tokyo, Nov. 27-29, 2014, pp. 349-354.
Bellotti et al., "Taking Email to Task: The Design and Evaluation of a Task Management Centered Email Tool," Proceedings of the SIGCHI Conference on Human Factors in Computing Systems, ACM, Apr. 5, 2003, 8 pages.
Wikipedia, "Cognitive Computing," Oct. 2015, 4 pages, retrieved from //en.wikipedia.org/wiki/Cognitive_computing.
Anonymous, "Email Research," Google, Oct. 2015, 10 pages, retrieved from https://sites.google.com/site/emailresearchorg/bibliography.
Anonymous, "Flow," getflow.com, Oct. 2015, 4 pages, retrieved from https://www.getflow.com.
Anonymous, "Mail Pilot," Mindsense, Oct. 2015, 6 pages, retrieved from http://mindsense.co/mailpilot.
Carlson et al., "SNoW User Guide," Cognitive Computation Group, Computer Science Department, University of Illinois, Urbana/Champaign, Aug. 1999, pp. 1-24.
Chiticariu et al., "SystemT: An Algebraic Approach to Declarative Information Extraction," Proceedings of the 48th Annual Meeting of the Association for Computational Linguistics, Jul. 11-16, 2010, pp. 128-137.
Chui et al., "The Social Economy: Unlocking value and productivity through social technologies," McKinsey & Company, Jul. 2012, 184 pages.
Dredze et al., "Automatically Classifying Emails into Activities," 2006 International Conference on Intelligent User Interfaces, Jan. 29-Feb. 1, 2006, 8 pages.
Dredze et al., "Intelligent Email: Aiding Users with AI," Association for the Advancement of Artificial Intelligence, Dec. 2008, 4 pages.
Ferrucci et al., "Building Watson: An Overview of the DeepQA Project," Association for the Advancement of Artificial Intelligence, Fall 2010, pp. 59-79.
Klimt et al., "Introducing the Enron Corpus," CEAS 2004, First Conference on Email and Anti-Spam, Jul. 30-31, 2004, 2 pages.
Kushmerick et al., "Activity-Centric Email: A Machine Learning Approach," American Association for Artificial Intelligence, Jan. 2006, pp. 1634-1637.
Lampert et al., "The Nature of Requests and Commitments in Email Messages," American Association for Artificial Intelligence, Jan. 2008, pp. 42-47.
McDowell et al., "Semantic Email," World Wide Web Consortium 2004, May 17-20, 2004, 11 pages.
Purver et al., "Detecting Action Items in Multi-Party Meetings: Annotation and Initial Experiments," Machine Learning for Multimodal Interaction, Third International Workshop, MLMI 2006, May 1-4, 2006, 12 pages.
Qadir et al., "Classifying Sentences as Speech Acts in Message Board Posts," In Proceedings of the 2011 Conference on Empirical Methods in Natural Language Processing, Jul. 27, 2011, 11 pages.
Scerri et al., "Classifying Action Items for Semantic Email," Proceedings of the International Conference on Language Resources and Evaluation, LREC 2010, May 17-23, 2010, pp. 3324-3330.
Kalia et al., "Monitoring Commitments in People-Driven Service Engagements," 2013 IEEE 10th International Conference on Services Computing, Jun. 28, 2013, pp. 160-167.
Anonymous, "Context-Aware Adaptive Message Prioritization," IP.com, 2012, 3 pages.
Youn et al., "A Comparative Study for Email Classification," Advances and Innovations in Systems, Computing Sciences and Software Engineering, Jan. 2007, pp. 387-391.
Sharma et al., "A Comparative Study of Classification Algorithms for Spam Email Data Analysis," International Journal on Computer Science and Engineering (IJCSE), vol. 3, No. 5, May 2011, pp. 1890-1895.
Hendler, J., "Watson: an academic perspective," Rensselaer Polytechnic Institute, Oct. 23, 2014, 28 pages, retrieved by http://www.slideshare.net/jahendler/watson-an-academics-perspective.
Winograd, T., "Designing a New Foundation for Design," Communications of the ACM, vol. 49, No. 5, May 2006, pp. 71-73.
Nezhad, H., U.S. Appl. No. 14/995,091, filed Jan. 13, 2016.

(56) References Cited

OTHER PUBLICATIONS

Kalia et al., "Identifying Business Tasks and Commitments from Email and Chat Conversations," HP Laboratories, 2013, pp. 1-11.
Kalia et al., U.S. Appl. No. 13/753,022, filed Jan. 29, 2013.

* cited by examiner verb 1 → class: request  verb 2 → class: other
John, could you <u>schedule</u> a meeting to <u>discuss</u> our project progress?

Extractions:
verb 1 → NER:John, AUX:could, PRON:you, mood:normal, action verb:true, enclosed:false
verb 2 → NER:John, PRON:you, mood:infinitive, action verb:true, enclosed:true Patterns:
verb 1 → NER,could,you,normal,action_verb,not_enclosed
verb 2 → NER,you,infinitive,action_verb,enclosed

FIG. 4A verb 3 → class: other  verb 4 → class: other
John, you could <u>schedule</u> a meeting to <u>discuss</u> our project progress?

Extractions:
verb 3 → NER:John, AUX:could, PRON:you, mood:normal, action verb:true, enclosed:false
verb 4 → NER:John, PRON:you, mood:infinitive, action verb:true, enclosed:true Patterns:
verb 3 → NER,you,could,normal,action_verb,not_enclosed
verb 4 → NER,you,infinitive,action_verb,enclosed

FIG. 4B

ADAPTIVE LEARNING OF ACTIONABLE STATEMENTS IN NATURAL LANGUAGE CONVERSATION

BACKGROUND

The present invention relates to machine learning, and more specifically, this invention relates to adaptive learning of actionable statement patterns in linguistic communications.

The advent of electronic communications has been a great boon for productivity, creativity, collaboration, and a host of other well-established benefits across almost every sector of the world economy. Typical electronic communications may involve initiating and exchanging information about work activities in conversations with others over channels such as email, chat, and messaging. A major part of employees' conversations entail statements on what work (actions) gets done, and by whom.

However, the increased frequency and speed at which communications are exchanged has generally resulted in a drastic increase in the volume of communication exchanged. This, in turn, generally results in individual communicators, especially humans, receiving a volume of communications which is impossible or impractical to process effectively and efficiently within the time constraints imposed by traditional work schedules. As a result, important action items represented in the communications backlog are often missed, detrimentally impacting the parties with an interest in the action items being efficiently and effectively completed.

To address this issue, various communication tools such as email programs, electronic calendars, etc. include features which allow a user to "flag" certain communications for future follow-up action, and to indicate priority of certain communications, in order to assist the user organize the various action items represented/contained in the user's communication backlog. However, these manual organization techniques and tools still rely on the user to process the information content represented in the communications, decide the appropriate action, and take that action (e.g. set a reminder, priority level, etc.). Therefore, these manual organization techniques assist the user's organization of the voluminous communications, but detrimentally do so by adding more tasks for the user to perform to achieve the organization, and provide no assistance with respect to communications the user fails to process and manually organize.

Automating the process of parsing and organizing communications, e.g. using natural language processing (NLP) techniques that leverage machine learning principles, also prove inadequate tools to solve the problem. While the automated nature of these techniques relieves the user from having to manually process and organize the voluminous body of incoming communications, these techniques suffer from limitations inherent to machine learning. For instance, the accuracy of the automated processing algorithm is a function of the propriety of the training set used to teach the machine how to parse the communications. Where so much of the informational content and meaning of modern communications is represented in the context of the communication—both the context of the text making up the communication and the context in which the communication is exchanged—the statistical approaches employed in modern machine learning are incapable of adapting to the wide range of contexts necessary for effective and efficient automation of processing modern communications.

For instance, actionable statements are often expressed in a variety of forms (e.g. patterns) and/or language structures, and may follow different styles due to personal preference, geographic location, culture, context, and complexity of the language in which the communication is being exchanged. From a language point of view, not all communications come in complete and well-formed sentences, but sometimes include grammatical and/or syntax errors, or include incomplete sentences. In addition, sometimes actions may be implied rather than explicitly stated. Further, many scenarios may require parsing several statements or interactions to identify an actionable statement.

Moreover, finding and training, or manually encoding, comprehensive and generic patterns and rules that cover all possible actions, contexts, etc., yet precisely and specifically capture actionable statements is an exceedingly difficult, if not impossible task. In addition, these conventional approaches are not scalable as new forms are encountered in new communications, contexts (e.g. different sectors of the economy often use different jargon and attach different meanings to the same terms), new communicators become involved in the exchange of communications, etc.

As a result, communications are often improperly handled by automated techniques, resulting in sometimes humorous misunderstandings, as exemplified by personal digital assistants, predictive dictionaries, etc. However, these limitations result in real and significant economic losses as communications are improperly handled, and thus action items are missed or mishandled.

Accordingly, it would be of great utility to provide systems, techniques, and computational tools capable of automatically interpreting communications using appropriate context to identify actionable statements, while overcoming the limitations of the conventional approaches set forth above.

SUMMARY

In one embodiment, a computer-implemented method is configured for identifying actionable statements in communications. The method includes: extracting features from at least one training statement; training a pattern recognition module to identify one or more types of patterns in actionable statements based at least in part on the features; and generating an actionable statement identification model using the trained action verb module and the trained pattern recognition module.

In another embodiment, a computer-implemented method is configured for identifying actionable statements in communications. The method includes: determining whether a statement includes an actionable statement; in response to determining the statement includes an actionable statement, predicting an actionable statement class of the actionable statement based on a pattern represented in the statement; and outputting the predicted actionable statement class to a user. The predicted actionable statement class is selected from among a plurality of actionable statement classes including promise(s) and request(s).

In yet another embodiment, a computer program product is configured for identifying actionable statements in communications. The computer program product includes a computer readable storage medium having program instructions embodied therewith, and the program instructions are executable by a processor to cause the processor to: determine, using the processor, whether the statement includes an actionable statement; in response to determining a statement includes an actionable statement, predict, using the processor, an actionable statement class of the actionable statement based on a pattern represented in the statement; and output, using the processor, the predicted actionable statement class to a user. The predicted actionable statement class is selected from among a plurality of actionable statement classes including question(s), promise(s) and request(s).

In still yet another embodiment, a system includes a processor and logic integrated with and/or executable by the processor. The logic is configured to: determine, using the processor, whether a statement includes an actionable statement; in response to determining the statement includes an actionable statement, predict, using the processor, an actionable statement class of the actionable statement based on a pattern represented in the statement; and output, using the processor, the predicted actionable statement class to a user. The predicted actionable statement class is selected from among a plurality of actionable statement classes including question(s), promise(s) and request(s).

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 4A-4B depict exemplary statements and features thereof, according to several embodiments.

DETAILED DESCRIPTION

Figure 1:
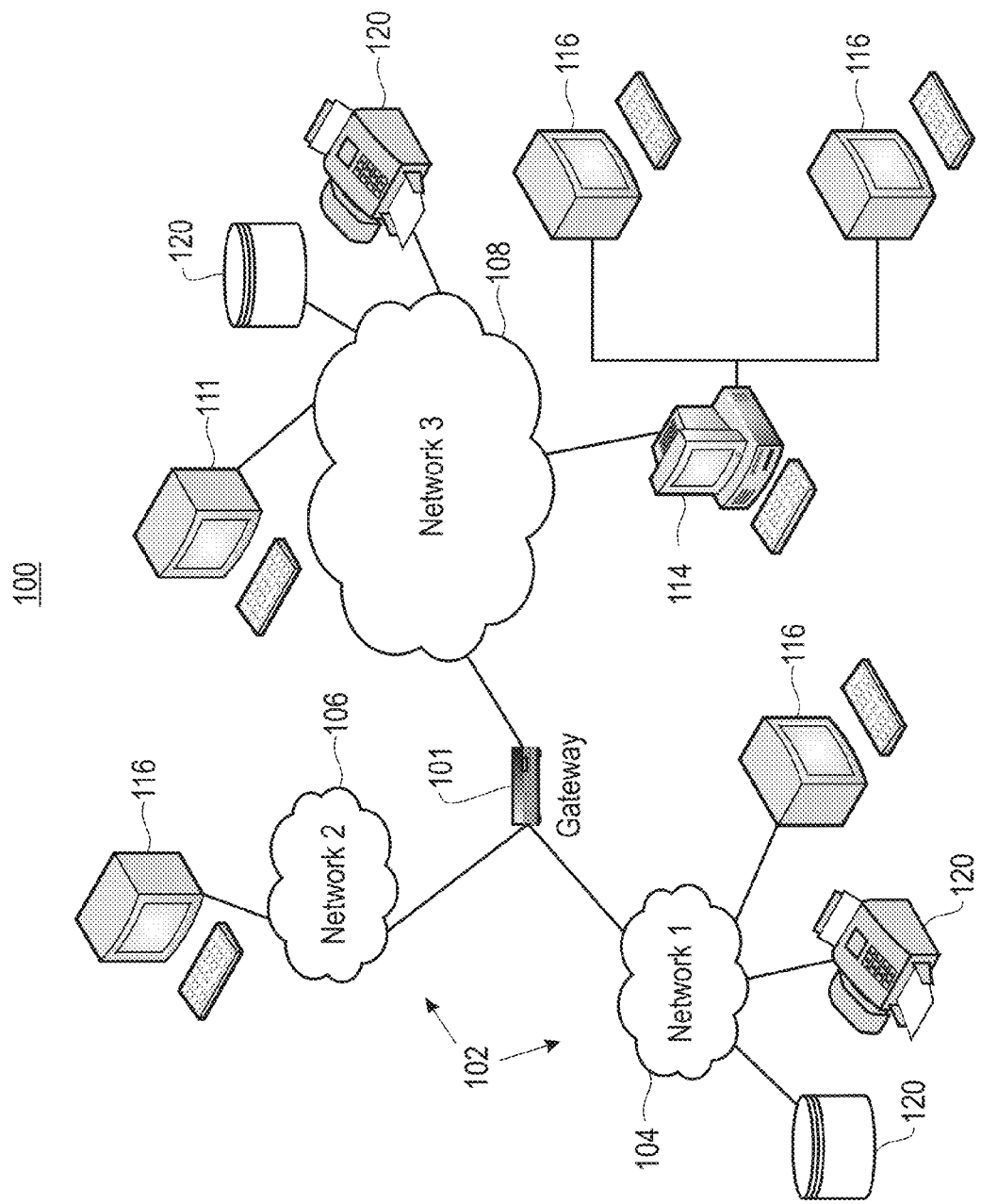
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Definitions

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The presently disclosed inventive concepts provide intelligent assistance in the work environment, and in particular address the issue of actionable statement identification in human conversations. In preferred approaches, the actionable statement identification is performed using one or more continuously adaptive models which may be configured, e.g. through adaptation, to uniquely identify actionable statements based at least in part on textual information derived from communications between an individual or a particular group of individuals.

As referred to herein, statements expressed in natural language and exchanging information about work activities in conversations with others over channels such as email, chat, and messaging are considered "actionable statements" when the conversations entail statements on what work (actions) gets done, and by whom.

As understood herein, an actionable statement includes a combination of a verb and an action pattern.

As understood herein, an action pattern is defined as a collection of a specific ordering of tokens and part of speech (POS) tags, and other features derived from a statement, some of which are related to the verb. In various embodiments, action patterns may include any features that may be identified using a feature extraction capability of a natural language processing engine, as would be understood by a person having ordinary skill in the art upon reading the present descriptions.

According to preferred embodiments, for an action pattern AP, let V be a set of all verbs, T be a list of all tokens except V, and G be a list of POS tags of T represented in a statement S, which may include one or more sentences. The action pattern AP in statement S may be defined as AP=(v; d; f) where v is an element of the set of verbs V; d is an ordered sequence of extracted and constructed features f; and f is an element of the union of sets T and G.

As understood herein, actionable statement identification may be considered a process involving the following defining features. Given a statement S, a set of predefined action classes C, and an action pattern AP in S, actionable statement identification includes correctly selecting class c (which is an element of the set C) for AP. Of course, actionable statement identification may include identifying plural action patterns in a sentence, in plural sentences, plural communications, etc. according to various embodiments of the presently disclosed inventive concepts.

As understood herein, when an action pattern specifies an action instance (also referred to as positive action pattern), the associated verb is defined herein as an "action verb."

As understood herein, an action instance is a portion of a statement, focused around a verb and one or more contextual elements of the statement, preferably at least one contextual element positioned before (e.g. to the left, in English) and at least one contextual element positioned after (e.g. to the right, in English) of the focus verb. In some approaches, an actionable statement may include a contextual element positioned after the focus verb, but not before the focus verb. In still more approaches, an actionable statement may include a contextual element positioned before the focus verb, but not after the focus verb.

According to particularly preferred embodiments, at least two classes of actionable statement, or "action classes" are included in the set of actionable statements subject to identification: promises and requests. A request is a communication including an action that the sender of the communication seeks to be performed by another party (e.g., a message recipient), for instance, "Can you please send me the file?" or "Send me the file by noon", while a promise generally considered a communication including a statement in which a commitment is made by the sender of the message, typically to one or more recipients of the communication or third party (e.g., "I will draft and send you the financial statement next Monday." or "I will draft and send Bob the financial statement next Monday.").

Of course, the foregoing are merely exemplary action patterns, and the presently disclosed inventive concepts may extend to additional and/or alternative types of action pattern, such as questions (which may or may not include requests), instructions (which may include, for example, direct orders rather than requests), representations (which may include, for example, indicia that a task has been completed), refusals (e.g. a negative response to a request), withdrawals (e.g. a rescission of a previously presented promise), etc. as would be understood by a person having ordinary skill in the art upon reading the present descriptions.

More specifically, and according to several embodiments, given two parties of people X and Y and an action A where |X|>0 and |Y|>0, a request and a promise may be defined as follows.

In preferred embodiments, a Request R is a tuple R=(X; Y; A; T) where X is requesting (assigning) Y to perform Action A, optionally by a due date T.

In addition, according to preferred approaches a Promise P is a tuple P=(X; Y; A; T) where X is committing to party Y that X will perform Action A, optionally by a due date T.

The foregoing definitions are provided to facilitate clarity of understanding with respect to the presently disclosed inventive concepts, and may include essential features for the operation of various embodiments of those concepts, as would be understood by a person having ordinary skill in the art upon reading the present descriptions. However, the foregoing definitions should not be considered exclusive of other equivalent embodiments that would be understood by a person having ordinary skill in the art upon reading the present disclosure.

General Embodiments

In various implementations, the presently disclosed inventive concepts may include one or more of the following general embodiments of actionable statement identification in communications.

In one general embodiment, a computer-implemented method is configured for identifying actionable statements in communications. The method includes: extracting features from at least one training statement; training a pattern recognition module to identify one or more types of patterns in actionable statements based at least in part on the features; and generating an actionable statement identification model using the trained action verb module and the trained pattern recognition module.

In another general embodiment, a computer-implemented method is configured for identifying actionable statements in communications. The method includes: determining whether a statement includes an actionable statement; in response to determining the statement includes an actionable statement, predicting an actionable statement class of the actionable statement based on a pattern represented in the statement; and outputting the predicted actionable statement class to a user. The predicted actionable statement class is selected from among a plurality of actionable statement classes including promise(s) and request(s).

In yet another general embodiment, a computer program product is configured for identifying actionable statements in communications. The computer program product includes a computer readable storage medium having program instructions embodied therewith, and the program instructions are executable by a processor to cause the processor to: determine, using the processor, whether the statement includes an actionable statement; in response to determining a statement includes an actionable statement, predict, using the processor, an actionable statement class of the actionable statement based on a pattern represented in the statement; and output, using the processor, the predicted actionable statement class to a user. The predicted actionable statement class is selected from among a plurality of actionable statement classes including promise(s) and request(s).

In still yet another general embodiment, a system includes a processor and logic integrated with and/or executable by the processor. The logic is configured to: determine, using the processor, whether a statement includes an actionable statement; in response to determining the statement includes an actionable statement, predict, using the processor, an actionable statement class of the actionable statement based on a pattern represented in the statement; and output, using the processor, the predicted actionable statement class to a user. The predicted actionable statement class is selected from among a plurality of actionable statement classes including promise(s) and request(s).

General Computing Concepts

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
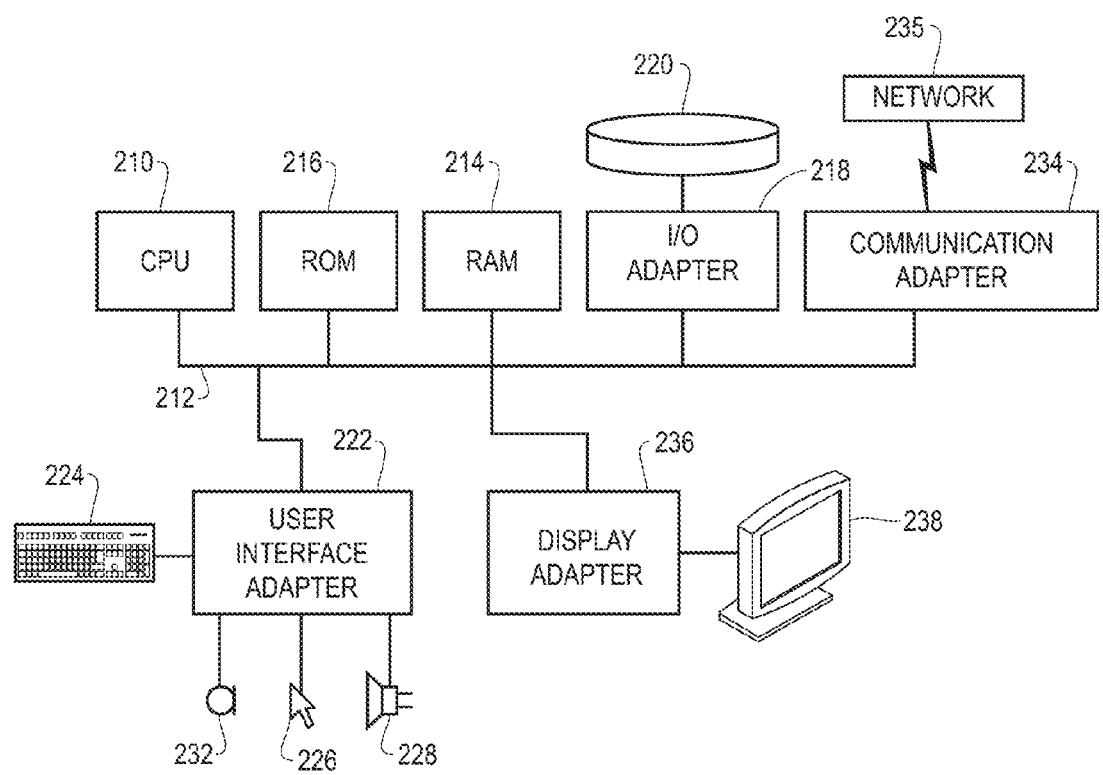
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Actionable Statement Identification

Returning now to the inventive concepts of systems, techniques, etc. for learning to identify actionable statements in communications, and implement those lessons to adaptively identify actionable statements in a personalized, domain-specific, continuous, and/or scalable manner involve various features, functions, components, etc. which may be utilized individually or in concert, in various embodiments. Preferred embodiments will employ a combination of these capabilities, and particularly preferred embodiments include all of the aforementioned capabilities.

Illustrative implementations of these features will be described in further detail below with reference to the Figures, which a skilled artisan will appreciate to be merely exemplary embodiments, and should not be considered limiting on the scope of the present disclosures. Descriptions referring to a particular embodiment should not be construed as exclusive of other embodiments unless expressly stated, but also should not be construed as requiring features described with regard to other embodiments unless expressly described as being a necessity of those embodiments.

The actionable statement identification systems, techniques, etc. described herein preferably are characterized by being adaptive to changes in communication style, behavior, etc. for individuals involved and/or referenced in the communications, in one embodiment.

The adaptive nature of preferred implementations of the presently disclosed inventive concepts confers advantageous ability to learn and implement new and/or modified approaches to identifying actionable statements based on changing text content, behavior patterns, communication context, etc. as would be understood by a person having ordinary skill in the art upon reading these descriptions. Accordingly, these concepts represent an improvement over traditional approaches to parsing human communications using machine learning techniques, as the adaptive embodiments disclosed herein are not limited by the training set utilized to teach the machine to parse the communications, but rather may continue to adjust to new information and behaviors as communications are carried out over the course of time.

In another embodiment the actionable statement identification systems, techniques, etc. preferably are characterized by being adaptive in a continuous manner, such that actionable statement identification is constantly "evolving" and adjusting to changes in communication style, content, behavior, context, etc.

In more embodiments, the presently disclosed actionable statement identification systems, techniques, etc. preferably are characterized by being personalized, such that actionable statement identification may be configured according to an individual's particular communication style, content, behavior, context, etc. In addition, these systems, techniques, etc. may be domain-specific, such that actionable statement identification is configured according to the communication style, content, behavior, context, etc. of a particular group of individuals. As described in further detail below with reference to FIG. 6, personalized and/or domain-specific actionable statement identification may be accomplished using a plurality of models, preferably operating in cooperation.

In still more embodiments, the presently disclosed inventive concepts are characterized by scalability, such that the capability to dynamically learn to identify actionable statements, and implement those lessons, enables the systems and techniques described herein to rapidly adopt to new communicators and/or new contexts introduced to an existing communication network, and/or adjust to the departure of communicators or removal of existing contexts from a communication network. This capability facilitates identification of actionable patterns in a much more efficient and effective manner than conventional approaches based on machine learning (particularly those relying on predefined training sets), ontology-based approaches relying on manually or statistically defined rules to parse communication content, etc. as would be understood by a person having ordinary skill in the art upon reading the present descriptions.

Of course, the instant descriptions also include embodiments characterized by one or more of the aforementioned adaptive, continuous, personalized, domain-specific, and/or scalable features and functionalities, without departing from the scope of the inventive concepts disclosed herein.

Particularly in the context of electronic communications, where a communication includes a promise, the sender of the communication is usually the entity committing to a promise included in the communication, and the recipient of the communication is most often the beneficiary of the promise. Similarly, where a communication includes a request, the sender of the communication is most often the entity making the request, and the recipient of the communication is most often the entity from whom the requested action is sought. Of course, some promises and requests may be included in communications where the beneficiary is a third party, who may or may not be included in the communication.

The presently disclosed inventive concepts are configured to adaptively learn and identify actionable statements within promises and requests, as well as other forms of statements typically included in natural language communications. The processes leverage concepts established in known natural language processing and feature identification techniques, such as identification of tokens (actual terms) used in statements, and tagging of features according to part of speech (POS) and other common labels, e.g. person type (NER), action verb (ACT), enclosed action verb (ACT_E), verb mood (MOOD), etc. as would be understood by a person having ordinary skill in the art upon reading the present descriptions.

Features and Feature Extraction

It is advantageous, in preferred embodiments, to extract features with respect to each verb in a sentence. The features may be used to learn various action patterns that identify action instances from the training samples. Features, in various embodiments, include one or more of tag and language token types. Preferably, tags and language token types may include/designate one or more of: (1) a Pronoun (PRON) token, an auxiliary (AUX) token, and/or one or more personal named entities (NER) tag that are related to the focus verb; (2) a mood of the verb; (3) whether the verb is an Action verb; (4) whether the verb encloses another verb/s; (5) whether a number of enclosed action verbs is greater than zero; and (6) a tense of the verb.

For text parsing and extracting exemplary features as set forth above, in some approaches the presently disclosed inventive concepts may leverage one or more known natural language parsing engines. In preferred approaches, and according to several exemplary embodiment presented herein, an IBM BIGINSIGHTS SYSTEM T™ which has an associated query language, called AQL (Annotation Query Language) may be used to get basic text annotations such as POS tags. However, any suitable NLP engine that would be appreciated by a person having ordinary skill in the art upon reading these disclosures may be employed, in other embodiments. Preferably, the NLP engine locates tokens and tags that are associated with the target verb, and may use the result of a NLP dependency parser, in some approaches.

Figure 3A:
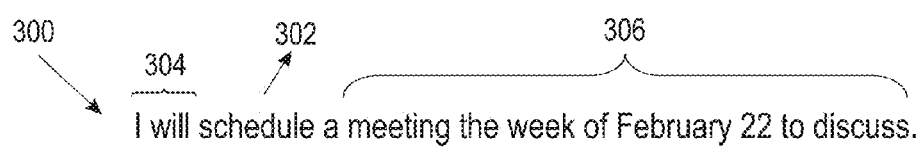
FIGS. 3A-3B depict exemplary statements including one or more of action instances and action verbs, according to several embodiments.
Figure 3B:
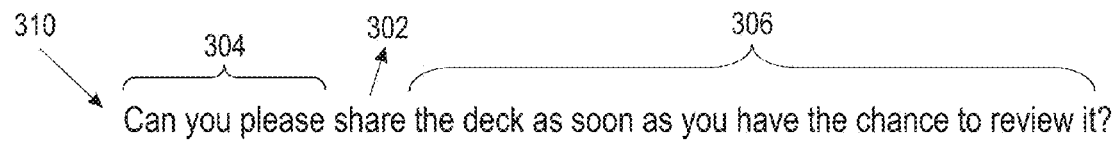
Figure 3C:
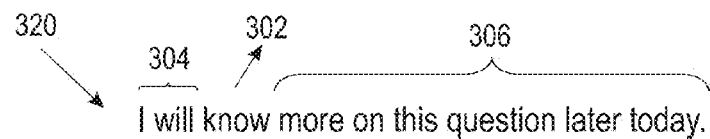
FIG. 3C depicts a sentence lacking an actionable statement, according to one approach.

For the token types "pronoun," and "auxiliary," and the tag of NER, it is advantageous to look in the left context (e.g. phrase 304 as shown in FIGS. 3A-3C) of the verb (e.g. verb 302 as shown in FIGS. 3A-3C) in these results. If there are more than one of "pronoun," and "auxiliary," and the tag of NER available in the left context, the closest one to the verb is analyzed to evaluate the presence of an actionable statement.

The mood of a verb changes based on the place it appears in the sentence and how it is related to prepositions (exemplary moods are: normal, imperative, infinitive, etc. as would be understood by a person having ordinary skill in the art upon reading the present descriptions), and also may be leveraged to evaluate the presence of an actionable statement.

The notion of enclosed verb in the list of features above refers to a verb that is not the dominating verb for the action instance but states "what/how" actions for the action instance. For example, in FIG. 4A, the verb "discuss" is enclosed by the verb "schedule" and therefore considered an enclosed verb. When a verb is enclosing one or more verbs and at least one of them is an action verb, then it has >0 enclosed action verbs. In such sentences, if the main verb is not an action verb (such as in the case of "Please let me know the results," in which "let" is not an action verb), it is of interest to find whether the enclosed verb is an action verb (such as "know" in this case), because if the enclosed verb is an action verb, this factor contributes to identifying the statement as an actionable statement.

Finally, the tense of the verb may be used as another feature, as it contributes to the identification of actionable statements because some verbs, for example past-tense verbs, do not specify an action instance.

In various embodiments, and based at least in part on the type of action promised or requested in a communication, there may be additional parameters of interest for the given action from the text. For instance, for a "send file" action, a desired parameter may include "File Name" and "File Type," while for a calendar invite action, desired parameters may include "List of Required Participants," "List of Optional Participants," "Time of the Event," "Venue/Place," "Subject of the Event," etc. in various embodiments and as would be understood by a person having ordinary skill in the art upon reading the present disclosure.

Additional exemplary action instances in illustrative communications are demonstrated in FIGS. 3A-3C, according to more embodiments. As defined above, an action instance is a portion of a statement, focused around a verb and one or more contextual elements of the statement, preferably at least one contextual element positioned before (e.g. to the left, in English) and at least one contextual element positioned after (e.g. to the right, in English) of the focus verb. In each of the statements 300, 310 and 320, the focus verb is represented by verb 302, while the contextual element positioned before the focus verb 302 is represented by phrase 304 and the contextual element positioned after the focus verb 302 is represented by phrase 306. Of course, in more complex statements or communications, there may be multiple sentences, each potentially having multiple focus verbs and/or contextual elements beyond the simplified scheme shown in FIGS. 3A-3C.

FIGS. 3A-3C show two actionable statements 300, 310 and a sentence 320 that does not contain any actionable statement. In FIGS. 3A-3B, the sentences 300, 310 contain a promise and a request, respectively, and each therefore contains one action instance. However, since the statement 320 depicted in FIG. 3C lacks an action verb, it does not include an action instance.

Notably, and as demonstrated in FIGS. 3A-3C, the same tokens and tags can appear in two action instances that belong to different classes (e.g., one promise and the other a request), for which their action patterns are different from each other. Hence, identifying/learning tokens and tags as individual elements does not help to correctly identify action instances and respective action classes.

In general, a sentence can have more than one action pattern when it has more than one verb (i.e., more than one action instance). For instance, consider the sentence "Please review the document and I will set up a meeting next week." This exemplary sentence has two verbs ("review" and "set up") that contribute to two different action instances. The first ("please review") is a request and the second ("I will set up") is a promise.

It is important, in such instances, to be able to recognize these two action instances separately rather than identifying the whole sentence as an actionable statement. This is one reason that the presently disclosed inventive concepts, according to preferred approaches, are configured to identify the action patterns (e.g. Definition 3) that characterize action instances.

Accordingly, in various embodiments actionable statement identification (e.g. according to Definition 4) may involve classifying action patterns into correct classes. Identified actionable statements may then be presented in a user friendly and interactive interface to cognitively assist communicators.

In preferred approaches the presently disclosed actionable statement identification concepts include a training stage and a prediction stage. As one component of the adaptive nature of these inventive implementations, the training and prediction stages may be linked in a feedback system to facilitate continuous learning even while prediction is being carried out.

Figure 5:
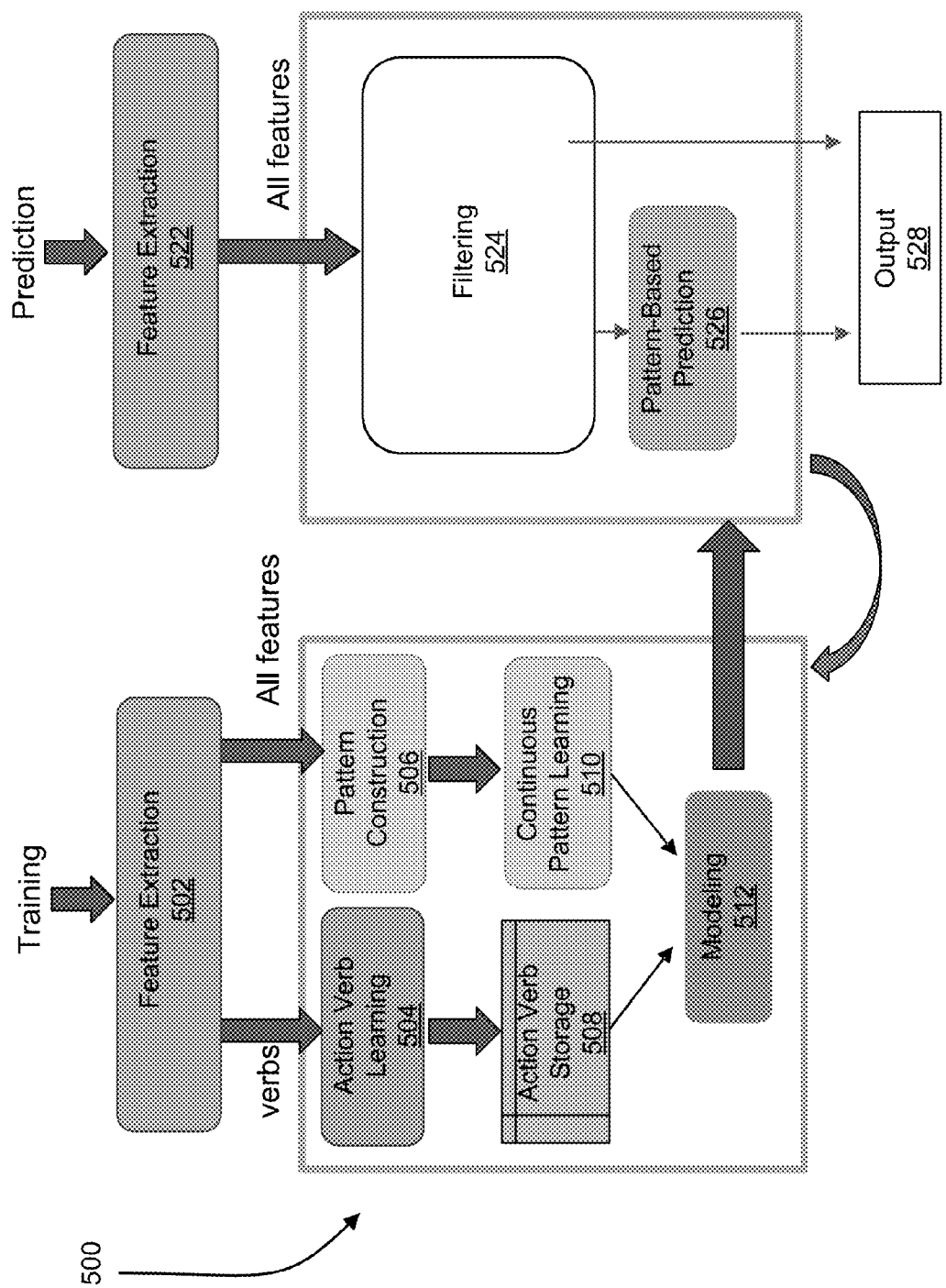
FIG. 5 depicts an exemplary organization for various models of actionable statement adaptive learning, according to one embodiment.

At a high level, this two-stage system 500 may be embodied as depicted in FIG. 5, in some approaches. As shown, the system 500 includes a plurality of modules 502-528. Each module 502-528 may be implemented via one or more virtual and/or physical components of a computer system, such as a processor, a memory, one or more computer readable storage media, etc. as would be understood by a person having ordinary skill in the art upon reading the present descriptions.

In the embodiment depicted in FIG. 5, training may be carried out using modules 502-512, while prediction may involve modules 522-526. Preferably, the system is adaptive via a feedback mechanism between the training and prediction portions, facilitating continuous adaptation to changes in communication tendencies. Module 528 may include an output functionality configured to output a conclusion of whether a communication includes an actionable statement or not, and the type of actionable statement (preferably promise, request, or other) as described in further detail below.

The training portion of the system 500 preferably includes a feature extraction module 502 configured to identify features such as POS and NLP tags and tokens, verbs, and dependencies.

Training portion also includes an action verb learning module 504 configured to adaptively learn action verbs, e.g. based on a training set and in response to being provided verbs from the feature extraction module 502. For instance, according to one approach the action verb learning module may be configured to determine whether a verb is actionable (e.g. based on tags applied by feature extraction module 502). In response to determining the verb is actionable, action verb learning module may determine whether the verb is enclosed (again optionally based on tags applied by the feature extraction module 502). In response to determining the action verb is not actionable, processing may cease, imparting computational efficiency on the presently disclosed inventive concepts.

In response to determining the action verb is enclosed, the action verb learning module may be configured to determine the verb is dependent. Conversely, action verb learning module 504 may be configured to determine the verb is independent in response to determining the verb is not enclosed, in preferred approaches.

The action verb learning module 502 is also preferably configured to store learned and/or identified action verbs in an action verb storage module 508.

Training portion also preferably includes a pattern construction module 506 configured to construct patterns, e.g. of verbs, NLP and/or POS tags and tokens, etc. and provide patterns to an adaptive, continuous pattern learning module 510.

Adaptive, continuous pattern learning module 510, in turn, is configured to continuously and adaptively learn patterns, especially actionable statement patterns.

In addition, modeling module 512 is configured to receive stored action verbs from action verb storage module 508 and learned patterns from adaptive, continuous pattern learning module 510, and in response to receiving this information, generate and/or update a model for identifying actionable statements in communications, using any techniques as described herein as well as equivalents thereof that would be understood by a person having ordinary skill in the art upon reading the present disclosures. Accordingly, the model may be provided to the prediction portion by modeling module 510, in various embodiments.

Prediction portion of the system 500 may also include a feature extraction module 522, which is preferably configured to identify and provide all features including one or more of POS tags, NLP tags, verbs and dependency information to a filtering module 524 of the prediction portion.

Filtering module 524, in turn, is preferably configured to determine, in response to receiving features from the feature extraction module 522, whether the statement includes an action verb. In response to determining no action verb is included in the statement, filtering module 524 is preferably configured to output a negative determination to output module 528 without permitting further computation to be performed. Accordingly, filtering module 524 contributes to computational efficiency of the presently disclosed inventive concepts in a manner that improves functioning of computers configured to perform actionable statement identification.

In response to determining the statement includes an action verb, filtering module 524 is configured, in some approaches, to provide the statement to pattern-based prediction module 526 for identification of the type of actionable statement included in the statement.

Accordingly, prediction portion of the system 500 may also include a pattern-based prediction module 526 configured to analyze the statement pattern and predict the type of actionable statement included in the statement. Statement type identification may be performed substantially as described herein, according to various embodiments. Upon predicting the type of actionable statement, pattern-based prediction module 526 is preferably configured to output the predicted actionable statement type to output module 528, which may pass the prediction to a user or workflow, e.g. for user feedback, cognitive assistance, etc. according to additional approaches and as described in further detail below.

Training

The learning phase, in various embodiments of the proposed approach, includes two components: (i) learning action verbs and (ii) learning action patterns. As mentioned earlier, learning action verbs is important as this knowledge may be utilized as a filter during the prediction phase before pattern matching and recognition, thus improving the computational efficiency of the prediction process by omitting inappropriate statements from the prediction analysis. The pattern learning phase, in one embodiment, involves two sub-steps of pattern construction (based on extracted featured), and adaptive pattern learning.

Identifying a verb as an action verb or not is important for the identification of actionable statements. Recall that not all verbs are considered actionable, especially in the context of work communications, although they may appear in patterns that are identical to those of action patterns in some embodiments.

For example, consider the following sentence fragments. Example 1: "I will rest", example 2: "I will meet". Both sentence fragments have similar tokens except the verbs but the first one is not considered an action instance because the action described by the verb is not considered important for the work environment.

It should be noted that having an action verb in a sentence is also not sufficient, alone, to make a statement an actionable statement, as demonstrated by the example in FIG. 4A. In other words, having an action verb in the statement is a necessary condition, but not sufficient to make it an actionable statement, in preferred embodiments. Therefore, action verbs are preferably learned from training samples. Algorithms 1 and 1.1, below show several proposed methods for learning different forms and language constructs that action verbs appear in, according to multiple embodiments.

---
Algorithm 1 Learning Action Verbs
---
1: input: String label, String verb, Set enclosed_verbs
2: output: updated verb Map
3: initialize or get existing Map<Verb, Boolean>
4: if label ∈ Type then
5:     if |enclosed_verbs| > 0 then
6:         if Map does not contain verb then
7:             Map ← <verb, false>
8:         end if
9:     else
10:        Map ← <verb, true>
11:    end if
12: end if
---

---
Algorithm 1.1: Learn Action Verbs
---
Input:Class label, Verb, Enclosed Verbs, Verb Map
    if(tag is actionable statement type)
        if(Verb ∈ Enclosed Verbs)
            if(Verb ∉ Verb Map)
                Verb Map <− (Verb, false)
            end if
        else
            Verb Map <− (verb, true)
        end if
    end if
---

In particular, an action verb can be singular and independent, e.g., such as "send" in the sentence "Please send me the file.", or they can be compound (appear with another action verb as enclosed), e.g., the verb "like" (which is not a singular, independent action verb), which has the enclosed verb "send" in the sentence "I would like you to send me the file." Advantageously, Algorithm 1 is able to learn both singular and compound action verbs.

In addition, an action verb can be singular and independent, e.g., such as "send" in the sentence "Please send me the file.", or they can be compound (appear with another action verb as enclosed), e.g., the verb "like" (which is not a singular, independent action verb), which has the enclosed verb "send" in the sentence "I would like you to send me the file." Advantageously, Algorithm 1.1 is able to learn both singular and compound action verbs.

Compound action verbs can be complex in statements and be found through following a chain of enclosed verbs until a singular action verb is reached. In cases involving compound verbs such as "like", it is advantageous to record that the verb "like" can appear in action instances in the enclosed form.

In the above embodiment, according to Algorithm 1, if the label of the verb is of the class "promise" or "request," and it is not enclosed with any other verb, then it is advantageous to record the verb with the value "true" (line 10). In other words, the verb appeared in a positive sample for one of the two classes of interest, and does not depend on another verb.

If the labeled verb (to a class) encloses other verbs and there is no record of the verb as an independent, singular form, it is advantageous to record the verb with the value "false" (line 7). This means that the verb cannot be used independently (alone) in action instances. Note that it is advantageous to update an action verb as dependent if the verb was not ever discovered in an independent example (line 6).

According to the preferred two-step learning approach, the second step in learning is the adaptive and continuous learning of action patterns from labeled samples. In one embodiment, these two steps are continuously performed in a production environment, meaning that the system continually performs training step as it encounters statements that it has not seen before (e.g. through user feedback) and/or in response to determining the user indicates a different class for a statement than determined using an automated technique as disclosed herein. The continuous learning may include considering adaptive learning and personalization conditions and thresholds.

To learn action patterns from labeled samples, in one approach, once features are extracted for a given action verb in a labeled sample, it is advantageous to obtain the order of pronoun (PRON) token, auxiliary (AUX) token, and personal name (NER) tags, optionally including the order of other token and other features (e.g. mood, action verb designation, whether or not other verbs are enclosed, etc.). In more approaches, it is advantageous to track some features at the token level, while others at the POS tag level.

For example, it is not necessary to record actual names of the people mentioned in all training sentences as in this case only the POS tag (Person) is important and hence it is advantageous to use the NER tag instead of the actual token. On the other hand, it is important to learn actual tokens of pronouns and auxiliary words. For example, "I will" is a promise while "They will" is not considered a promise (the speaker is not the one who is committing).

Indeed, tracking such features at the POS tags level according to one embodiment leads to incorrect identification of a statement that fits the pattern as an action instance. An action pattern includes a set of features such as a sequence of patterns and tags (e.g. for NLP tags related to the focus verb, such as NER, ACT, ACT_E, etc.; mood of the focus verb; whether the focus verb is an action verb and/or encloses other verb(s), etc.), and other independent features (e.g., verb tense). In particular, and according to one embodiment, during learning the proposed method takes the combined order of features (1) to (4) set forth above as one feature (they may to be considered together). Further, it is advantageous process and leverage the order of tokens and tags as they appear in the sentences of the NLP tags related to the focus verb (e.g., the order of tags and tokens of NLP tags related to the focus verb in FIG. 4A is "NER,could, you"). It may also be an advantage to extract independent features (e.g. verb tense).

According to one implementation, training may be accomplished based in part on adapting a classifier such as a Winnow-based multi-class classifier for the presently disclosed learning process. The Sparse Network of Winnows (SNOW) representation of such a classifier is similar to a one layer neural network but differs in how the classifier updates weights. In particular, the weight updating process is mistake driven and has the capability to both promote and demote weights.

According to various embodiments of the presently disclosed inventive concepts, the classification network has target nodes, and each input feature has weights associated with each target node. In preferred approaches, the network will have target nodes as promise, request, and other. A positive prediction means the algorithm predicts a target node (>threshold) and negative prediction otherwise.

In particularly preferred approaches, node promotion/demotion may occur according to the following exemplary expressions. Let t be the target node let $w_{t,i}$ be the weight of an active feature $A_i$; let $Q_t$ be the threshold for the target node let $\alpha_t$ be the promotion constant; and let $\beta_t$ be the demotion constant, respectively. Both promotion and demotion parameters are positive constants, where $\alpha_t > 1$ and $0 < \beta_t < 1$. Let $A_t = \{A_1, \ldots, A_n\}$ be the set of active features present in the current sample communication, for a given example linked to the target node t.

In preferred approaches, employing Algorithm 1 promotes weights of the target node t as shown below in Equation 1 when the algorithm generates a negative prediction for t according to the expression $\Sigma_{i \in A_t} w_{t,i} < Q_t$, yet the provided label (in training examples) matches t.

$$\forall_i, w_{t,i} = w_{t,i} \cdot \alpha_t \quad (1)$$

In other words, for all active features $A_i$ and corresponding weights $w_{t,i}$ of a target node t the weights are multiplied by the promotion constant $\alpha_t$ in response to determining that the sum of weights $w_{t,i}$ for the node t and set of active features $A_t$ is less than the node threshold $Q_t$ (causing a negative prediction to be generated for node t) but the pattern actually is a correct match for the type of actionable statement represented by node t.

In more approaches, in response to determining a particular pattern matches a different set of tokens, promotion may be utilized to reinforce the pattern match to the different set of tokens.

Conversely, in exemplary approaches a node may be demoted in response to determining the sum of the weights is greater than the node threshold, but the pattern actually does not match the type of actionable statement represented by the node. Demotion may be performed, in preferred approaches, according to Equation 2.

$$\forall_i, w_{t,i} = w_{t,i} \cdot \beta_t \quad (2)$$

When algorithm predicts negatively (does not predict) for a particular class label, the weights for the "active features" are promoted for the negatively predicted class, in several approaches.

When algorithm predicts positively but does not match the class label, then weights for the "active features" are demoted for the positively predicted class, in more approaches.

Preferably, all the other weights remain unchanged including those of features that are not present in the current sample. Weights are updated based on both the threshold and status of prediction, and stability is achieved when it is trained with enough samples. However, the presently disclosed inventive embodiments, as noted above, are adaptive and may be employed without substantial training, although accuracy of predictions may be low in early applications of insufficiently trained embodiments (e.g. until stability is achieved).

In more embodiments, learning patterns may proceed according to the following algorithm.

---

Algorithm 1.2: Learn Patterns

---

Input: extracted features, Class Label, Verb, Enclosed Verbs, promotion_factor, demotion_factor
    learnActionVerbs(Class Label, Verb, Enclosed Verbs)
    Category Weights W = getActiveFeatureWeights(extracted features)
    for each $C_i$ class category
        Compute Weight ($WC_i$) = $\Sigma$ ($W_j$)
    end for
    Winning_Category C = Max({$WC_i$})
    if(C != Class Label)
        for each weight $W_i$ of C, $W_i$ = $W_i$ * demotion_factor
        end for
    else if ($C_x$ != C && $C_x$ == Class Label)
        for each weight $W_i$ of $C_x$, $W_i$ = $W_i$ * promotion factor
        end for
    end if

---

The aforementioned algorithms adaptively train the classifier to recognize actionable statements such as promises and/or requests using a single, global model. In more embodiments, it may be advantageous to additionally and/or alternatively train models for particular individuals, or groups of individuals (e.g. individuals sharing a particular context influencing communication style, content of communications, etc. as would be understood by a person having ordinary skill in the art upon reading the present descriptions. Optionally, various embodiments of the presently disclosed inventive concepts may include the ability to toggle involvement of personalized and/or shared models to contribute to actionable statement identification (or not) for a particular set of communications and/or communicators.

Accordingly, in preferred approaches the presently disclosed inventive concepts include training one or more personalized models to identify actionable statements. More preferably, the personalized model learning process is managed through a user feedback mechanism.

In one approach, during initial training, the system is bootstrapped using the global model, which was trained using the training data. The user feedback may contribute to adapting the learned model and/or building personalized models when the feedback is assessed to be of personal opinion nature as described below. The users' feedback are preferably collected in two forms: (i) tagging an identified action as not being a request or a promise, and (ii) tagging a statement (indeed a verb within a statement) as being a promise or request that is not captured.

The user feedback is assessed with respect to the matching action pattern in the model, if one exists, and leads to the promotion or demotion operation on the features' weights. In order to support personalization, it is advantageous to employ two additional parameters associated to each pattern: (1) a support score s, which keeps track of the number of times that a pattern has received a positive support for a certain class of statement from one or more individuals, and (2) the identity of users who have supported the pattern.

In more embodiments, it is advantageous to apply a threshold γ on s for each pattern to identify which model level (e.g. global, shared, or personalized) the score belongs to. For a given action pattern AP, when s(AP)<γ, the pattern would stay active only for the users who support it, in one approach. And, if s(AP)≥γ, it is preferably promoted to the higher level model in the hierarchy (e.g. a global or shared model, depending on the configuration).

In several approaches, where user feedback is determined to indicate demotion of a given pattern AP in the global model, but for which after demotion still s(AP)≥γ, s remains active in the global model, but it would be recorded in the personal model of the user who demoted it as an excluded pattern. The described personalized model allows the user to keep personal patterns in their personalized model, even when those personalized patterns are not supported by system-wide or domain-wide support (for a shared model). Essentially, individuals may "opt-out" of participation in the higher level models with respect to particular patterns. At the same time, an individual's decision to demote a particular recognition does not disrupt the global or shared recognition reflected in the corresponding models unless sufficient consensus is reached to cross the threshold γ.

According to even more embodiments, training may involve training shared models. The learning of a shared model can be bootstrapped through a training phase with samples labeled with the specific domain name for the model. Domain models can also be adapted through user feedback by users who are tagged as belonging to that domain. Shared model configuration in the system may also be associated to a domain support score threshold σ<<γ. When shared models are enabled for a specific user, according to one embodiment action patterns with a support score s below γ are kept in personal models. In more embodiments, if σ<s(AP)<γ, the action pattern belongs to the shared model, and s(AP)≥γ the pattern may be stored in the global model.

Accordingly, the presently disclosed inventive concepts preferably include evaluating and determining values of the foregoing support scores, and taking appropriate promotion/demotion action in response to determining the support score has a value greater, less than, or equal to the above thresholds according to the foregoing expressions.

Various embodiments of these concepts may include any one or more of training global, shared, and/or personalized models, in various approaches.

Prediction

In the prediction stage, according to one embodiment it is advantageous to select the highest aggregated weighted class as the predicted actionable statement type (i.e., employing a winner takes all paradigm). In rare but possible occasions of a tie, it is advantageous to make the decision based on a separate support score based on learning shared or personalized models (described above) to select one of promise or request classes.

Prediction may preferably be performed substantially according to the following descriptions, in various embodiments.

In one approach, prediction is a two-step process. In the first step, it is advantageous to determine whether the verb is designated as an action verb (either as independent or dependent). In the second step, pattern matching-based identification is performed. This two-stage identification process advantageously avoids keeping track of every verb in the action patterns which can explode the number of action patterns it has to learn.

According to one exemplary embodiment, Algorithm 2 below outlines steps in an actionable statement identification process according to the presently disclosed inventive concepts. In essence, the algorithm operatively predicts the class of an actionable statement for the extracted features in response to determining the verb is an independent or dependent action verb (lines 7-8).

In more approaches, the prediction process preferably takes into consideration the enclosed verb set. If the verb is not recorded as an independent or dependent action verb, it is advantageous to predict the class as "other" (line 10).

---

Algorithm 2 Action Pattern Recognition

---

1: input: Sentence s
2: output: Map verb_type
3: List verbs ← extract Verbs(s)
4: for all v ∈ verbs do
5:     List enclosed_verbs ← extractEnclosed(s,v)
6:     List features ← ExtractFeatures(s,v)
7:     if isLearnedActionVerb(v) then
8:         verb_type ← predictType(v, features, enclosed_verbs)
9:     else
10:        verb_type ← <v,other_class>
11:    end if
12: end for
13: return verb_type

---

Preferably, this model is able to learn the set of action verbs from the training samples (i.e., bootstrapped). In one implementation, a training set may be populated with some seed action verbs taken from a particular domain and/or existing users of an enterprise email client, chat or messaging system, social media service, etc. as would be understood by a person having ordinary skill in the art upon reading the present descriptions.

In preferred approaches, during the process of actionable statement identification, priority is given to patterns in the personalized models, followed by shared models and global models. This facilitates considering personalized models, and domain models over the patterns in the global model. It should be noted that not every user may have a personal model (in case they have not provided any feedback, or when their feedback are applied to patterns in global and domain levels), in various approaches. Similarly, various embodiments may omit a domain specific and/or shared model, and be implemented using a global model exclusively. Further still, some embodiments may include utilizing one or more arbitrarily defined model "levels", e.g. for a department, organization, domain, geographical location, etc. as would be understood by a person having ordinary skill in the art upon reading the present descriptions.

In more embodiments, actionable statement class prediction may be performed substantially according to the following Algorithm 2.1.

---

Algorithm 2.1: Predict Actionable Statement Class

---

Input: extracted features, Verb, enclosed Verbs, Verb Map
Output: Action class
Category Weights W = getActiveFeatureWeights(extracted features)
    if(isIndependentActionVerb(Verb, Verb Map)
        for each $C_i$ class category
            Compute Weight ($WC_i$) = Σ ($W_j$)
        end for
        Winning_Category C = Max({$WC_i$})
        return C -continued Algorithm 2.1: Predict Actionable Statement Class

```
    else if(isDependentActionVerb(Verb, Verb Map))
        if(IsIndependentActionVerb(enclosed Verbs, Verb Map)
            for each C_i class category
                Compute Weight (WC_i) = Σ (W_j)
            end for
            Winning_Category C = Max({WC_i})
            return C
        else
            return "other category class"
        end if
    else
        return "other category class"
    end if
```

Model Organization

Figure 6:
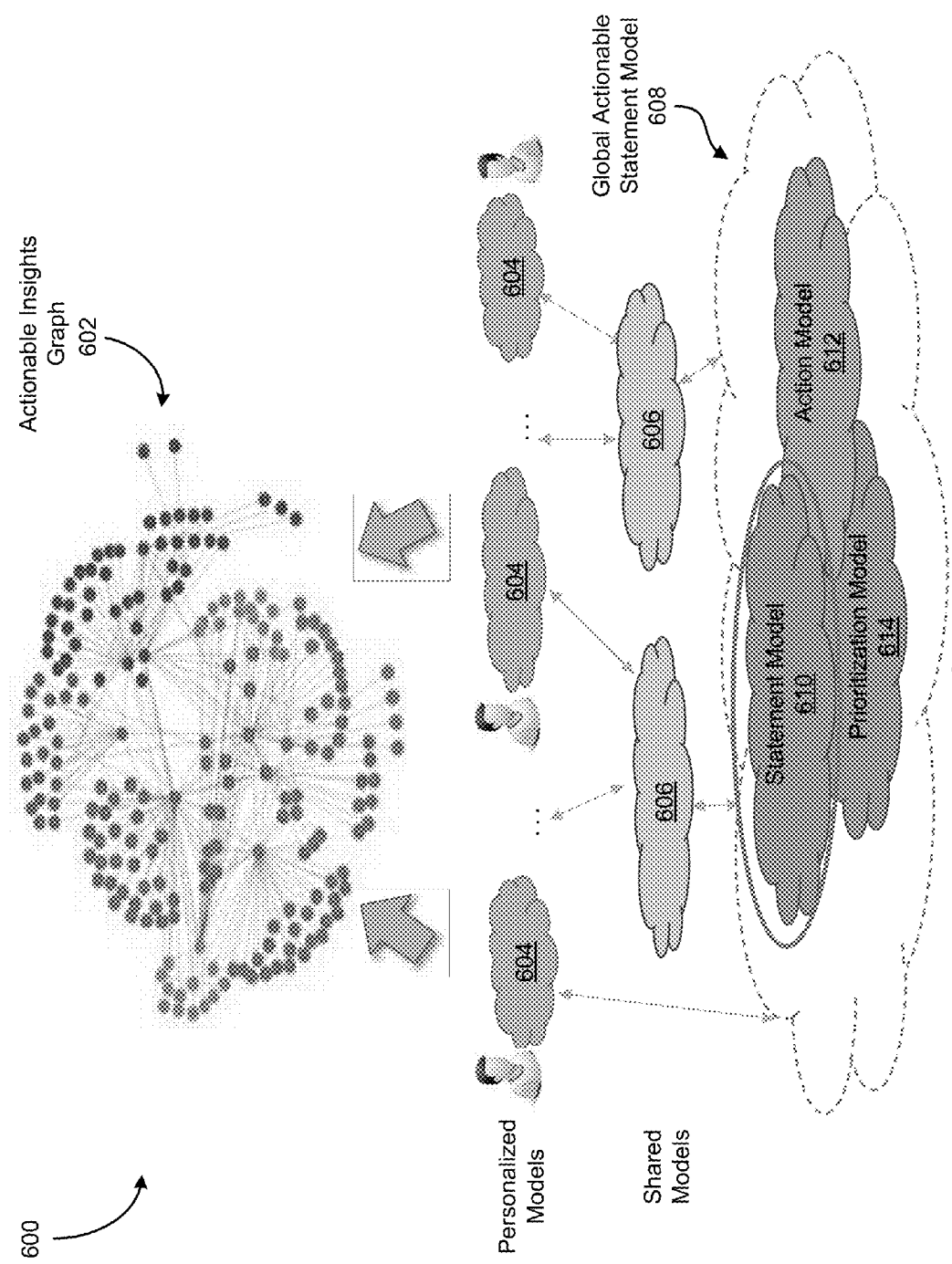
FIG. 6 is a simplified schematic of an adaptive model for learning and identifying action statements in communications, according to one embodiment.

Turning now to FIG. 6, an exemplary organization 600 for various models of actionable statement adaptive learning is shown, according to one embodiment. The organization 600, in various approaches, may include one or more layers. The number of layers may depend upon the context in which the organization 600 is employed, and preferably represents a network of one or more individuals and groups of individuals.

As shown in FIG. 6, and according to a preferred approach, the organization 600 includes three layers.

A first layer includes one or more personalized models 604, each being configured to adaptively and/or continuously learn an individual's personal communication and behavior patterns, and utilize the learning process to effectively and efficiently identify actionable statements within communications in which the individual is involved and/or referenced. The personalized models 604 may be represented as a personalized actionable insights graph 602

A second layer includes one or more shared models 606, each being configured to adaptively and/or continuously learn a group of individuals' communication and behavior patterns, and utilize the learning process to effectively and efficiently identify actionable statements within communications in which one or more of the group of individuals is involved and/or referenced. In preferred approaches, the shared models 606 are configured to adaptively and/or continuously learn to identify actionable statements for a plurality of the individuals for which the personalized models 604 are configured to adaptively and/or continuously learn to identify actionable statements. As such, the shared models 606 may be based at least in part on one or more of the personalized models 604, in some approaches.

As will be understood by a person having ordinary skill in the art upon reading the present disclosure, not all of the personalized models 604 need be utilized to define or configure the shared models 606, and not all individuals for which personalized models 604 are configured need be served by a shared model 606.

Groups of individuals, in different embodiments, may include any suitable partition of the population in the context of various types of communications that occur in daily life. For example, groups may include individuals involved in various different economic sectors, such as individuals involved in a particular career, profession, etc., individuals employed by a particular employer, in a particular geographic location (e.g. according to primary language spoken), etc. as would be understood by a person having ordinary skill in the art upon reading the present descriptions.

In more embodiments, groups may include individuals that perform particular roles in the context of an activity or communication, such as individuals responsible for providing products or services, individuals entitled to receive products or services, supervisors, subordinates, individuals working in a particular department and/or on a particular project, etc. as would be understood by a person having ordinary skill in the art upon reading the present descriptions.

Again as shown in FIG. 6, the organization 600 includes a third layer comprising a global actionable statement model 608. The global actionable statement model 608 is configured to adaptively and/or continuously learn one or more individuals' and/or groups of individuals' communication and behavior patterns, and utilize the learning process to effectively and efficiently identify actionable statements within communications in which one or more of the individuals and/or groups of individuals is involved and/or referenced.

So as to facilitate optimal learning and continuous adaptation to changing communication styles, new terminology, new or different behaviors or behavior patterns, etc., the global actionable statement model 608 is preferably configured to adaptively and/or continuously learn to identify actionable statements in communications for all individuals for which a personal model 604 is configured and/or groups of individuals for which a shared model 606 is configured. More preferably, the global actionable statement model 608 is preferably configured to adaptively and/or continuously learn to identify actionable statements in communications for each individual and group of individuals in the network.

In addition, the global actionable statement model 608 may be configured to learn to identify actionable statements based at least in part on one or more of the personalized models 604 and/or shared models 606.

In addition, and in preferred approaches, the global actionable statement model 608 preferably includes a plurality of models. Each of the plurality of models may be configured to adaptively and/or continuously learn in a particular context of communication. For instance, in particularly preferred embodiments the plurality of models include a statement model 610 configured to adaptively and/or continuously learn in the particular context of statements; an action model 612 configured to adaptively and/or continuously learn in the particular context of actions; and a prioritization model 614 configured to adaptively and/or continuously learn in the particular context of prioritization.

In some approaches, statement model 610 may be configured to adaptively identify actionable statements in communications exchanged between entities within a communication network.

In various embodiments, action model 612 may be configured to determine an appropriate action to be taken in response to an actionable statement. Exemplary actions may include organizational tasks such as creating a reminder, adding an item to a to-do list, setting a follow-up period for responsive action, etc. as would be understood by a person having ordinary skill in the art upon reading the present descriptions. Exemplary actions may also include scheduling tasks such as scheduling a meeting, scheduling a processing job, setting a deadline, etc. as would be understood by a person having ordinary skill in the art upon reading the present descriptions. Exemplary actions may further include communication tasks such as sending an email, message, posting to a social medium, etc. as would be understood by a person having ordinary skill in the art upon reading the present descriptions. Exemplary actions may still further include delivery tasks such as delivering requested information to a requesting entity, e.g. delivering data, a report, a written communication, etc. as would be understood by a person having ordinary skill in the art upon reading the present descriptions.

Similarly, in additional embodiments the prioritization model 614 may be configured to determine an appropriate priority for an actionable statement or statements, e.g. a priority to assign to a message for the user's review, a priority for an appropriate action to be taken in response to receiving the communication including the actionable statement, etc. as would be understood by a person having ordinary skill in the art upon reading the present descriptions. In preferred approaches, prioritization model 614 is configured to determine a predetermined priority level selected from urgent, important, and low.

The plurality of models forming the global actionable statement identification model 608 may also cooperatively operate to facilitate contextually appropriate identification of actionable statements in communications, and provide cognitive assistance to individuals involved in those communications, in preferred embodiments.

In more approaches, the various models in each layer of the organization 600 are preferably organized in a hierarchical fashion, substantially as depicted in FIG. 6.

Of course, in some embodiments it is advantageous to include capabilities for promoting or demoting particular models from one layer of the organization 600 to another.

In addition, it is advantageous to allow individuals to designate whether or not a particular model, particularly a shared model 606 and/or global actionable statement identification model 608, should be employed to provide cognitive assistance with respect to their communications. For instance, within an enterprise having various different departments responsible for different tasks (e.g. legal, financial, production, sales, research and development, etc.) may have a plurality of shared models 606, each being configured to identify actionable statements in communications for one of the departments. Individuals working in one department may wish to disable shared models 606 configured to identify actionable statements for another department, as those models may be inapplicable to the terminology and/or context of communications in the individual's department.

In implementation of the presently disclosed inventive embodiments, it was found that these adaptive actionable statement identification techniques provide superior performance to existing techniques for identifying actionable statements. For instance, one test case comparing the presently disclosed inventive concepts to a manual rule writing process resulted in the adaptive actionable statement identification techniques identifying 55 of 57 actionable statements in a test data set, where the manual rule writing process only identifies 49 of the 57. This superior performance also contributes to the scalability of the inventive concepts, as the ability to adaptively identify actionable statements using a robust automated process as described herein coupled with high accuracy and precision provides flexibility to the system and allows tolerance of adding new communicators, new styles of communication, etc. as would be understood by a person having ordinary skill in the art upon reading the present descriptions.

Applications

During the actionable statement learning and identification, the process may not extract all desired information about the actionable statements which are important for a comprehensive presentation of the action to the user, specifically those that are mentioned beyond the sentence in which actionable statement is expressed in. Depending on the action class (e.g. promise, request, question, instruction, withdrawal, etc. as set forth herein) and also the type of the action (e.g. respond, send file, calendar invite, etc.), it is desirable to extract specific information attributes (metadata). In particular, we define and recognize a set of action types such as calendar-related, send document, reminder, etc., using a set of rules (optionally written in a query language such as AQL).

Each of these types of action have distinct set of desired attributes in addition to those of action classes of promise or request. For each action type, it is advantageous to define a template that includes of a set of desired features to be extracted and gathered from the text of conversation among participants who exchange information about that action.

For example, in various exemplary embodiments the template for a calendar action type contains the following attributes: invite chair/organizer, required participants, optional participants, subject, meeting time, and meeting location.

FIG. 3B shows an example for action type "send document" where it is requesting to share a document. For this type, the desired features in one approach are document name, document type, or a set of keywords that are input to a search function that looks for the matching document candidates.

This extraction process may preferably be guided through pre-defined templates for each action type. For instance, the extraction process may employ three techniques in order to find the template attributes beyond the sentence that contain the action verb: (i) co-reference resolution may be used to link different sentences depending on the common entities that are referenced among them, (ii) looking for missing values of attributes in the template in the neighboring sentences, before (for Person Names and Named Entities, often) and after (e.g. for further details about timing, location, etc. in case of calendar action types), and for any implicit entity links between sentences; and (iii) looking through the conversation threads on the same topic (e.g., email chains) if the same action is discussed in prior conversations. Using these techniques allows the method to populate the template with information for template attributes that are then present to the user.

Accordingly, the presently disclosed inventive actionable statement identification learning and prediction processes convey advantages to the field of electronic communications by providing cognitive assistance to users, enabling the users to efficiently and effectively address the large volume of communications with which working individuals are faced on a daily basis, and which otherwise are prone to delay and/or failure to respond, and corresponding detrimental real-world consequences.

Figure 7:
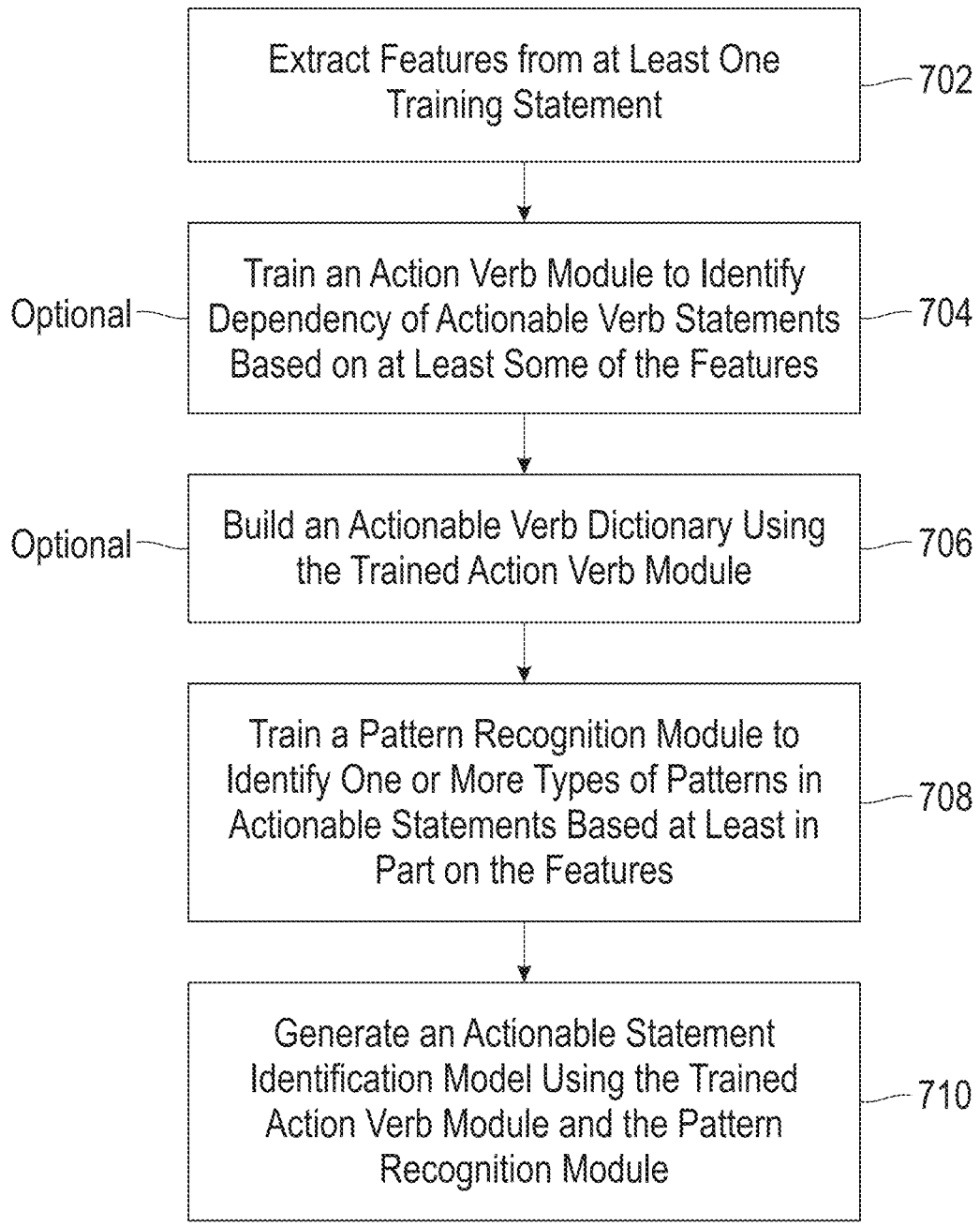
FIG. 7 is a flowchart of a method, according to one embodiment.

Now referring to FIG. 7, a flowchart of a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) may be implemented in hardware and/or software, and preferably having at least one hardware component may be utilized in any device to perform one or more steps of the method 700. Illustrative processors include, but are not limited to, a central processing unit (CPU), a graphics processing unit (GPU), an application specific integrated circuit (ASIC), a field programmable gate array (FPGA), etc., combinations thereof, or any other suitable computing device known in the art.

As shown in FIG. 7, method 700 may initiate with operation 702, where features are extracted from at least one training statement.

Method 700 may also include operation 704, in which an action verb module is optionally trained to identify dependency (e.g. dependent versus independent) of actionable verb statements. The identification is preferably based on some or all of the extracted features, and more preferably based on verbs.

Method 700 also includes operation 706, where an actionable verb dictionary is optionally built using the trained action verb module.

In operation 708, a pattern recognition module is trained to identify one or more types of patterns in actionable statements based at least in part on the features. Preferably, all extracted features are used to train the pattern recognition module to provide a robust representation of actionable statement types and facilitate stability in prediction of actionable statement types during subsequent prediction.

In operation 710, an actionable statement identification model is generated based on the trained action verb module and the trained pattern recognition module.

Of course, in various approaches method 700 may include one or more additional and/or alternative features and/or operations. For instance, according to one embodiment the method 700 may include performing adaptive training on the actionable statement identification model based on one or more sample statements. More preferably, adaptive training is performed continuously as a prediction module predicts types of actionable statements present in one or more sample statements.

Preferably, the adaptive training is mistake-driven. Mistake-driven adaptive training, according to various approaches, may include promoting one or more weights corresponding to a particular actionable statement type at least partially in response to predicting an actionable statement type is different from the predicted actionable statement type; and/or demoting one or more weights corresponding to a particular actionable statement type at least partially in response to determining a predicted actionable statement type is the predicted actionable statement type.

The promoting is preferably performed in further response to determining the actionable statement type is the particular actionable statement type, and the demoting is preferably performed in further response to determining the actionable statement type is not the particular actionable statement type In several approaches, the extracted features include one or more of: verbs; part of speech (POS) tags, POS tokens; natural language parsing (NLP) tags; NLP tokens; context phrases; and dependency information. Moreover, the context phrases may include at least one phrase occurring before an action verb in one or more of the training statements and at least one phrase occurring after the action verb in one or more of the training statements.

In additional embodiments, the action verb module is trained to identify dependency of actionable verb statements based on determining whether an action verb is enclosed by another verb.

Figure 8:
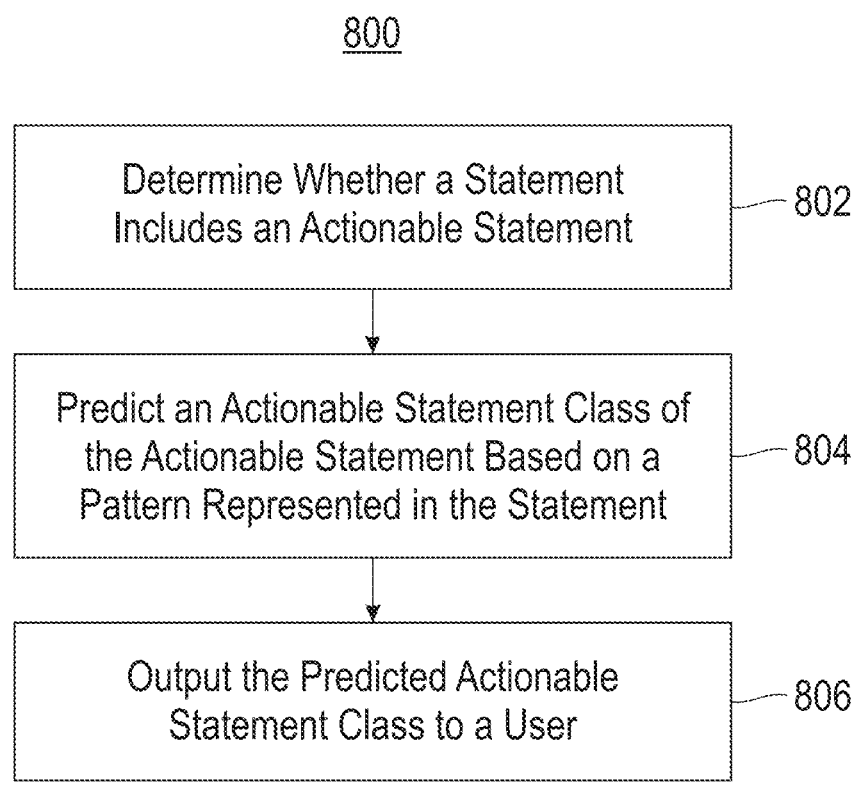
FIG. 8 is a flowchart of a method, according to one embodiment.

Now referring to FIG. 8, a flowchart of a method 800 is shown according to one embodiment. The method 800 may be performed in accordance with the present invention in any of the environments depicted in FIGS. 1-6, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) may be implemented in hardware and/or software, and preferably having at least one hardware component may be utilized in any device to perform one or more steps of the method 800. Illustrative processors include, but are not limited to, a central processing unit (CPU), a graphics processing unit (GPU), an application specific integrated circuit (ASIC), a field programmable gate array (FPGA), etc., combinations thereof, or any other suitable computing device known in the art.

In various embodiments, the method 800 is preferably performed in conjunction with performing a training technique, such as shown in FIG. 7, according to one embodiment. More preferably, training and prediction are performed continuously to facilitate adaptive capabilities of the actionable statement identification process.

As shown in FIG. 8, method 800 may initiate with operation 802, a statement is analyzed to determine whether the statement includes an actionable statement.

In operation 804, and in response to determining the statement includes an actionable statement, an actionable statement class for the actionable statement is predicted, based on a pattern represented in the statement. The actionable statement class is selected from among a plurality of actionable statement classes comprising promise and request.

Method 800 also includes operation 806, in which the predicted actionable statement class is output to a user, e.g. via a display.

Of course, in various approaches method 800 may include one or more additional and/or alternative features and/or operations. For instance, according to one embodiment the method 800 may include performing adaptive training on the actionable statement identification model based on one or more sample statements. More preferably, adaptive training is performed continuously as a prediction module predicts types of actionable statements present in one or more sample statements.

For instance, in one embodiment the predicting is performed using an actionable statement identification model, and method 800 includes adaptively training the actionable statement identification model based on the predicting.

The method 800 may additionally and/or alternatively include determining whether the statement includes an actionable statement comprises determining whether the statement includes one or more action verbs.

In more embodiments, the method 800 includes, in response to determining the statement does not include an actionable statement, outputting an indication that the statement does not include an actionable statement without performing the predicting.

Additionally and/or alternatively, the predicting is performed at verb-level granularity. In other words, according to preferred embodiments a single statement may include multiple verbs, and each verb may be individually analyzed (preferably in context of surrounding words, which may include other verbs separately analyzed) so that statements containing multiple verbs may be effectively and efficiently analyzed to determine whether a single, or multiple action verbs and/or verb types are present in the statement.

The method may also include predicting an actionable statement class of a second actionable statement included in the statement, in some approaches.

The predicting may include determining an actionable statement class having an associated weight with a value higher than one or more weights associated with other of the actionable statement classes, in more approaches.

In response to determining no single actionable statement class has an associated weight with a value higher than one or more weights associated with other of the actionable statement classes, method 800 may include evaluating a support score of one or more of the actionable statement classes.

In various embodiments, the predicting is based on a personalized actionable statement model, a shared actionable statement model; or a global actionable statement model.

The pattern upon which prediction is based may include an ordering of one or more features extracted from the statement; and the one or more features are preferably selected from verbs; part of speech (POS) tags, POS tokens; natural language parsing (NLP) tags; NLP tokens; context phrases; and dependency information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for automatically identifying actionable statements in electronic communications, the method comprising:
    obtaining a first set of rules that define actionable statements as a function of tags, tokens, and contextual elements associated with target verbs;
    extracting features from at least one training statement based on the first set of rules, wherein the features include one or more of tags and language token types for words of the statement;
    training a pattern recognition module to identify one or more types of patterns in actionable statements based at least in part on the features; and
    training an action verb module to identify dependency of the actionable statements based on at least some of the features;
    generating an actionable statement identification model using the trained action verb module and the trained pattern recognition module, the actionable statement identification model including a plurality of target nodes, each node having associated therewith one or more active features and one or more corresponding weights of the one or more active features;
    adaptively training the actionable statement model by at least one of promoting and demoting the weights corresponding to the active features associated with some or all of the plurality of target nodes,
    wherein weights corresponding to the active features are promoted in response to determining a true positive match between active features of a particular statement within an electronic communication and the active features to which the weights correspond; and
    wherein weights corresponding to the active features are demoted in response to determining a false positive match between active features of a particular statement within an electronic communication and the active features to which the weights correspond;
    receiving an incoming electronic communication;
    extracting the features of the words and phrases in statements of the incoming electronic communication;
    filtering the statements to identify the statements that include one or more action verbs as actionable statements and the statements that do not include any action verbs as filtered out statements;
    outputting the statements that were removed by the filtering to a user for user feedback;
    analyzing statement patterns of the actionable statements to predict a type of each of the actionable statements, by applying the actionable statement identification model to the actionable statements;
    outputting a predicted actionable statement type to the user for user feedback; and
    performing continual training of the actionable statement identification model by providing the user feedback identifying statements that haven not been seen before or the user feedback indicating a different type for a statement than the predicted type to the actionable statement identification model.

2. The method as recited in claim 1, comprising:
    building an actionable verb dictionary using the trained action verb module; and
    wherein the adaptive training is performed continuously as a prediction module predicts types of actionable statements present in one or more sample statements.

3. The method as recited in claim 1, wherein the action verb module is trained to identify dependency of actionable verb statements based on determining whether an action verb is enclosed by another verb.

4. The computer-implemented method as recited in claim 1, wherein weights corresponding to the active features are promoted in response to determining a true positive mismatch between active features of a particular statement within an electronic communication and the active features to which the weights correspond.

5. The computer-implemented method as recited in claim 1, wherein promoting the weights corresponding to the active features associated with some or all of the plurality of target nodes comprises, for all active features $A_i$ and corresponding weights $w_{t,i}$ of a target node t among the plurality of target nodes, multiplying the corresponding weights $w_{t,i}$ by a promotion constant $\alpha_t$ in response to determining that a sum of the weights $w_{t,i}$ for the node t and set of active features $A_t$ is less than a node threshold $Q_t$.

6. The computer-implemented method as recited in claim 1, wherein demoting the weights corresponding to the active features associated with some or all of the plurality of target nodes comprises, for all active features $A_i$ and corresponding weights $w_{t,i}$ of a target node t among the plurality of target nodes, multiplying the corresponding weights $w_{t,i}$ by a demotion constant $\beta_t$ in response to determining that a sum of the weights $w_{t,i}$ for the node t and set of active features $A_t$ is greater than a node threshold $Q_t$.

7. The computer-implemented method as recited in claim 1, wherein the plurality of target nodes comprise a "promise" node, a "request" node, and an "other" node.

8. The computer-implemented method as recited in claim 1,
wherein the tags and token types correspond to one or more of:
a pronoun (PRON) token; an auxiliary (AUX) token;
one or more personal named entities (NER) tags relating to a focus verb present in the training statement;
a mood of one or more verbs present in the training statement;
whether one or more verbs present in the training statement are action verbs;
whether one or more verbs present in the training statement enclose another verb or verbs present in the training statement;
whether a number of enclosed action verbs present in the training statement is greater than zero; and
a tense of at least one verb present in the training statement.

9. The computer-implemented method as recited in claim 8, wherein the mood of the one or more verbs present in the training statement are selected from: normal, imperative, and infinitive.

10. The computer-implemented method as recited in claim 8, wherein past-tense verbs present in the training statement are disqualified from being considered action verbs.

11. The computer-implemented method as recited in claim 1, wherein the features are extracted using an Annotation Query Language (AQL).

12. The computer-implemented method as recited in claim 1,
wherein the action verb module is trained to identify dependency of actionable verb statements based on determining whether an action verb is enclosed by another verb;
wherein weights corresponding to the active features are promoted in response to determining a true positive mismatch between active features of a particular statement within an electronic communication and the active features to which the weights correspond;
wherein promoting the weights corresponding to the active features associated with some or all of the plurality of target nodes comprises, for all active features $A_i$ and corresponding weights $w_{t,i}$ of a target node t among the plurality of target nodes, multiplying the corresponding weights $w_{t,i}$ by a promotion constant $\alpha_t$ in response to determining that a sum of the weights $w_{t,i}$ for the node t and set of active features $A_t$ is less than a node threshold $Q_t$; and
wherein the plurality of target nodes comprise a "promise" node, a "request" node, and an "other" node.

13. A computer program product for identifying actionable statements in electronic communications, the computer program product comprising a computer readable storage medium having program instructions embodied therewith, the program instructions executable by a processor to cause the processor to:
obtain a first set of rules that define actionable statements as a function of tags, tokens, and contextual elements associated with target verbs;
extract features from at least one training statement based on the first set of rules, wherein the features include one or more of tags and language token types for words of the statement;
train a pattern recognition module to identify one or more types of patterns in actionable statements based at least in part on the features; and
train an action verb module to identify dependency of the actionable statements based on at least some of the features;
generate an actionable statement identification model using the trained action verb module and the trained pattern recognition module, the actionable statement identification model including a plurality of target nodes, each node having associated therewith one or more active features and one or more corresponding weights of the one or more active features;
adaptively train the actionable statement model by at least one of promoting and demoting the weights corresponding to the active features associated with some or all of the plurality of target nodes,
wherein weights corresponding to the active features are promoted in response to determining a true positive match between active features of a particular statement within an electronic communication and the active features to which the weights correspond; and
wherein weights corresponding to the active features are demoted in response to determining a false positive match between active features of a particular statement within an electronic communication and the active features to which the weights correspond;
receive an incoming electronic communication;
extract the features of the words and phrases in statements of the incoming electronic communication;
filter the statements to identify the statements that include one or more action verbs as actionable statements and the statements that do not include any action verbs as filtered out statements;
output the statements that were removed by the filtering to a user for user feedback;
analyze statement patterns of the actionable statements to predict a type of each of the actionable statements, by applying the actionable statement identification model to the actionable statements;
output a predicted actionable statement type to the user for user feedback; and
perform continual training of the actionable statement identification model by providing the user feedback identifying statements that haven not been seen before or the user feedback indicating a different type for a statement than the predicted type to the actionable statement identification model.

14. A system, comprising:
a processor and logic integrated with and/or executable by the processor, the logic being configured to cause the processor to:
determine whether a statement, within an electronic communication, includes an actionable statement,
wherein determining whether a statement includes an actionable statement comprises:
  obtaining a first set of rules that define actionable statements as a function of tags, tokens, and contextual elements associated with target verbs;
  extracting features from at least one training statement based on the first set of rules;
  training a pattern recognition module to identify one or more types of patterns in actionable statements based at least in part on the features; and
  training an action verb module to identify dependency of the actionable statements based on at least some of the features;
  generating an actionable statement identification model using the trained action verb module and the trained pattern recognition module, the actionable statement identification model including a plurality of target nodes, each node having associated therewith one or more active features and one or more corresponding weights of the one or more active features;
  adaptively training the actionable statement model by at least one of promoting and demoting the weights corresponding to the active features associated with some or all of the plurality of target nodes,
  wherein weights corresponding to the active features are promoted in response to determining a true positive match between active features of a particular statement within an electronic communication and the active features to which the weights correspond; and
  wherein weights corresponding to the active features are demoted in response to determining a false positive match between active features of a particular statement within an electronic communication and the active features to which the weights correspond;
in response to determining the statement includes an actionable statement, predicting, from among a plurality of potential actionable statement classes, an actionable statement class of the actionable statement, wherein the prediction is based on a pattern represented in the statement and comprises:
  computing a weight of each of the plurality of potential actionable statement classes based on the pattern represented in the statement; and
  determining from among the plurality of potential actionable statement classes, an actionable statement class having an associated weight with a value higher than weights associated with other of the plurality of potential actionable statement classes is the predicted actionable statement class of the actionable statement; and
outputting the predicted actionable statement class of the actionable statement to a user;
receiving feedback from the user in response to outputting the predicted actionable statement class;
providing the user feedback to the actionable statement model to facilitate adaptively training the actionable statement model; and
wherein the predicted actionable statement class is selected from among a plurality of actionable statement classes comprising promises.

15. The system as recited in claim 14, comprising,
in response to determining the statement does not include an actionable verb, outputting an indication that the statement is not an actionable statement without performing the predicting;
in response to determining no single actionable statement class has an associated weight with a value higher than one or more weights associated with other of the actionable statement classes, evaluating a support score of one or more of the actionable statement classes; and
wherein the predicting comprises determining an actionable statement class having an associated weight with a value higher than one or more weights associated with other of the actionable statement classes;
wherein the predicting is based on at least a personalized actionable statement model and a shared actionable statement model; and wherein the personalized actionable statement model is given priority over the shared actionable statement model;
wherein the action verb module is trained to identify dependency of actionable verb statements based on determining whether an action verb is enclosed by another verb;
wherein weights corresponding to the active features are promoted in response to determining a true positive mismatch between active features of a particular statement within an electronic communication and the active features to which the weights correspond;
wherein promoting the weights corresponding to the active features associated with some or all of the plurality of target nodes comprises, for all active features $A_t$ and corresponding weights $w_t, i$ of a target node t among the plurality of target nodes, multiplying the corresponding weights $w_t, i$ by a promotion constant at in response to determining that a sum of the weights $w_t, i$ for the node t and set of active features $A_t$ is less than a node threshold $Q_t$; and
wherein the plurality of target nodes comprise a "promise" node, a "request" node, and an "other" node.

* * * * *